(12) United States Patent
Park et al.

(10) Patent No.: US 10,725,871 B2
(45) Date of Patent: Jul. 28, 2020

(54) STORAGE DEVICE CAPABLE OF PERFORMING PEER-TO-PEER COMMUNICATION AND DATA STORAGE SYSTEM INCLUDING THE SAME

(71) Applicant: Samsung Electronics Co., Ltd., Suwon-si, Gyeonggi-do (KR)

(72) Inventors: Jun Bum Park, Suwon-si (KR); Ho Jun Shim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 287 days.

(21) Appl. No.: 15/698,902

(22) Filed: Sep. 8, 2017

(65) Prior Publication Data
US 2018/0101450 A1   Apr. 12, 2018

(30) Foreign Application Priority Data
Oct. 7, 2016   (KR) ........................ 10-2016-0129901

(51) Int. Cl.
| | | |
|---|---|---|
| G06F 11/14 | (2006.01) | |
| G06F 11/16 | (2006.01) | |
| G06F 13/42 | (2006.01) | |
| G06F 13/14 | (2006.01) | |

(52) U.S. Cl.
CPC ...... *G06F 11/1469* (2013.01); *G06F 11/1662* (2013.01); *G06F 13/4282* (2013.01); *G06F 2201/805* (2013.01); *G06F 2201/82* (2013.01)

(58) Field of Classification Search
CPC ....... G06F 11/14; G06F 13/42; G06F 2201/00

USPC .......................................................... 710/40
See application file for complete search history.

(56) References Cited

U.S. PATENT DOCUMENTS

| | | | |
|---|---|---|---|
| 7,631,218 B2 | 12/2009 | Daikokuya et al. | |
| 7,721,143 B2 | 5/2010 | Humlicek | |
| 7,970,994 B2 | 6/2011 | Wack | |
| 8,086,939 B2 | 12/2011 | Tsai et al. | |
| 8,327,224 B2 | 12/2012 | Larsen et al. | |
| 9,959,062 B1* | 5/2018 | Piszczek ............... | G06F 3/0611 |
| 10,423,487 B2* | 9/2019 | Marripudi ........... | G06F 13/4282 |
| 2006/0206753 A1* | 9/2006 | Yamato ............... | G06F 11/1092 |
| | | | 714/6.32 |
| 2015/0012775 A1* | 1/2015 | Cudak ................... | G06F 3/0619 |
| | | | 714/6.22 |
| 2015/0100821 A1* | 4/2015 | Sakurai ............... | G06F 11/1092 |
| | | | 714/6.23 |
| 2015/0301894 A1 | 10/2015 | Dennett et al. | |
| 2016/0048356 A1 | 2/2016 | Galloway et al. | |

(Continued)

FOREIGN PATENT DOCUMENTS

JP   2010224803 A   10/2010

*Primary Examiner* — Christopher B Shin
(74) *Attorney, Agent, or Firm* — Harness, Dickey & Pierce, P.L.C.

(57) ABSTRACT

A first storage device capable of performing peer-to-peer communications with a second storage device includes a first submission queue for storing a first operation code; a first completion queue for storing a first indication signal; and a first controller configured to, read the first operation code stored in the first submission queue, create a command including a second operation code based on the first operation code, issue the command to the second storage device, and receive and processes a second completion signal transmitted from the second storage device.

8 Claims, 11 Drawing Sheets

(56) References Cited

U.S. PATENT DOCUMENTS

| | | |
|---|---|---|
| 2016/0077764 A1 | 3/2016 | Ori |
| 2016/0246521 A1* | 8/2016 | Dewitt .................. G06F 3/061 |
| 2017/0123995 A1* | 5/2017 | Freyensee .............. G06F 12/10 |
| 2017/0262380 A1* | 9/2017 | Yoshida .............. G06F 12/1009 |
| 2017/0293448 A1* | 10/2017 | Bolen .................. G06F 3/0632 |
| 2018/0095679 A1* | 4/2018 | Wysocki .............. G06F 3/0632 |
| 2018/0101456 A1* | 4/2018 | Critchley ............ G06F 11/1076 |
| 2019/0188099 A1* | 6/2019 | Roberts .............. G06F 11/1092 |
| 2019/0205053 A1* | 7/2019 | Nomura ............... G06F 9/5077 |

\* cited by examiner

STORAGE DEVICE CAPABLE OF PERFORMING PEER-TO-PEER COMMUNICATION AND DATA STORAGE SYSTEM INCLUDING THE SAME

CROSS-REFERENCE TO RELATED APPLICATIONS

This application claims priority under 35 U.S.C. § 119 from Korean Patent Application No. 10-2016-0129901 filed on Oct. 7, 2016, the disclosure of which is hereby incorporated by reference in its entirety.

BACKGROUND

1. Field

At least some example embodiments of the inventive concepts relate to a storage device capable of performing peer-to-peer communications, and particularly to a storage device for performing a peer-to-peer distributed parallel redundant array of independent/inexpensive disks (RAID) rebuild operation or a data rebuild operation through peer-to-peer communications between peripheral component interconnect express (PCIe) devices, and a data storage system including the storage device.

2. Related Art

In computer storage, RAID is a data storage virtualization technology for combining multiple physical disk drive components into a single logical unit for the purpose of data redundancy and/or performance enhancement.

Data are distributed to physical disk drive components using one of various methods referred to as RAID levels in accordance with redundancy and performance requirements. Standard RAID levels include RAID 0 to RAID 6.

SUMMARY

According to at least some example embodiments of the inventive concepts, a first storage device capable of performing peer-to-peer communications with a second storage device, the first storage device including a first submission queue for storing a first operation code; a first completion queue for storing a first indication signal; and a first controller configured to, read the first operation code stored in the first submission queue, create a command including a second operation code based on the first operation code, issue the command to the second storage device, and receive and processes a second completion signal transmitted from the second storage device.

According to at least some example embodiments of the inventive concepts, a data storage system includes a peripheral component interconnect express (PCIe) switch; source storage devices connected to the PCIe switch; and a rebuild storage device connected to the PCIe switch, wherein the source storage devices are configured to communicate, through peer-to-peer communications with each other via the PCIe switch, data for performing a data rebuild operation for the rebuild storage device.

According to at least some example embodiments of the inventive concepts, a data storage system includes a peripheral component interconnect express (PCIe) switch; source storage devices connected to the PCIe switch; and a rebuild storage device connected to the PCIe switch, wherein the source storage devices are configured to communicate, through peer-to-peer communications with each other via the PCIe switch, data for performing a data rebuild operation for the rebuild storage device.

According to at least some example embodiments of the inventive concepts, a data storage system includes a peripheral component interconnect express (PCIe) switch; and a plurality of storage devices connected to the PCIe switch, the plurality of storage devices including, a first source storage device, one or more second source storage devices, and a rebuild storage device, the first source storage device being configured to, receive a rebuild command, read, via the PCIe switch, one or more units of data from the one or more second source storage devices, respectively, based on the rebuild command, rebuild first data in accordance with a redundant array of independent disks (RAID) scheme, based on the read one or more units of data, and store the rebuilt data in the rebuild storage device, the first data being data of a fault storage device from among the plurality of storage devices.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
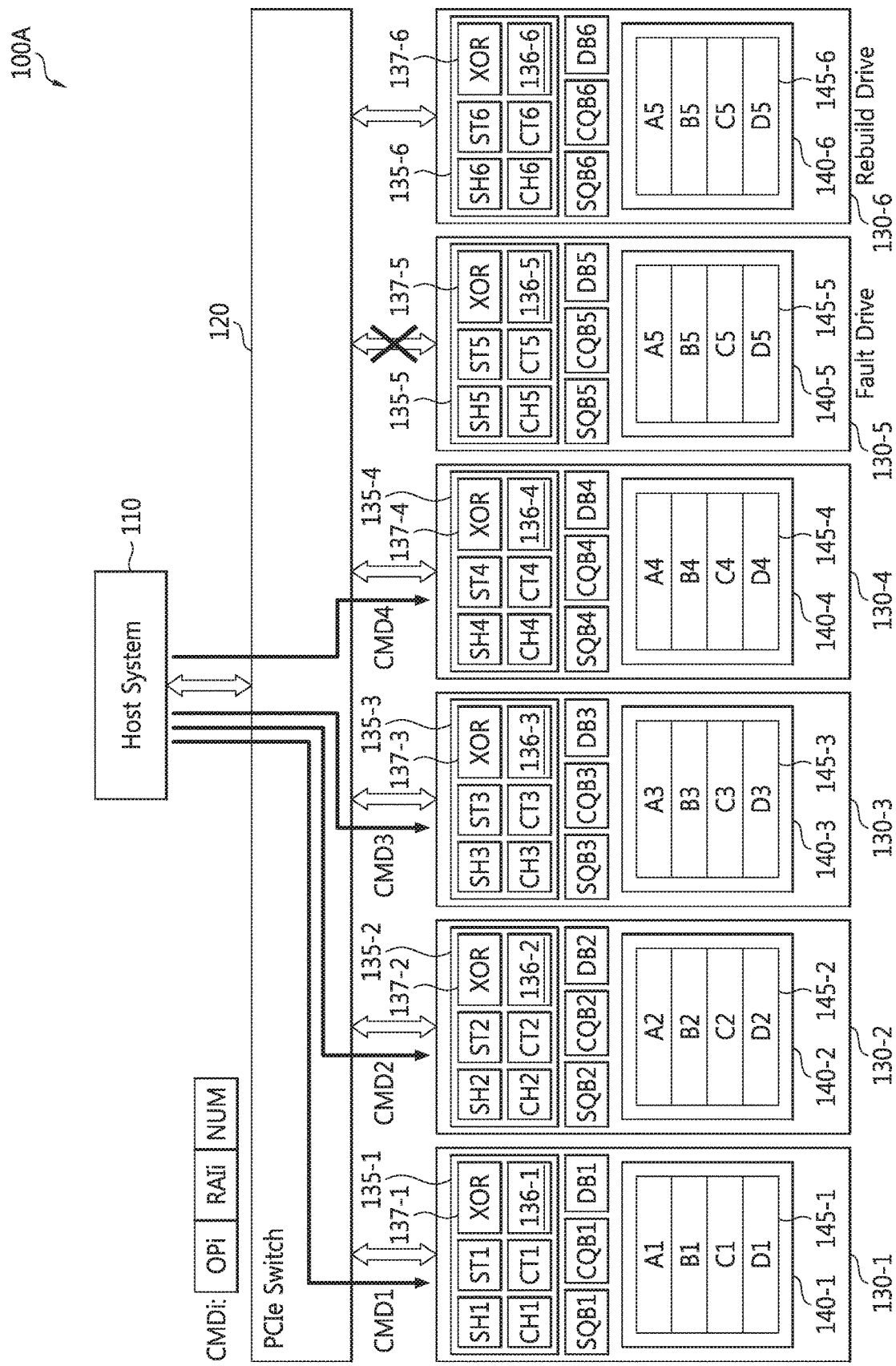
FIG. 1 is a schematic block diagram of a RAID system according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

A drive according to at least some example embodiments of the inventive concepts may be used as at least one of a master device and a slave device. The master device refers to a device for creating a command, and the slave device refers to a device for executing the command.

Each drive according to at least some example embodiments of the inventive concepts includes a submission queue (or submission queue buffer) for storing at least one submission queue entry, a completion queue (or completion queue buffer) for storing at least one completion queue entry, and/or a data buffer for storing data related to at least one of the submission queue entry and the completion queue entry.

According to at least some example embodiments of the inventive concepts, a controller memory buffer includes at least two of the submission queue, the completion queue, a submission queue Head Doorbell register, a submission queue Tail Doorbell register, a completion queue Head Doorbell register, a completion queue Tail Doorbell register, a storage space for storing each of a plurality of pieces of positional information (for example, addresses), and a data buffer. According to at least some example embodiments of the inventive concepts, the controller memory buffer may be embodied by a memory buffer mapped onto a PCIe base address register (BAR).

The plurality of pieces of positional information (or addresses) may be positional information (or addresses) indicating the submission queue, the completion queue, the data buffer, the submission queue Head Doorbell register, the submission queue Tail Doorbell register, the completion queue Head Doorbell register, or the completion queue Tail Doorbell register.

A drive (referred to as "master drive" or "master storage device") used as a master device among drives creates a write command, a read command, or a RAID rebuild command for itself using data stored in the submission queue, the completion queue, and/or the data buffer, and issues or outputs the write command, the read command, or the RAID rebuild command to a drive (referred to as "slave drive", "peer drive", or "peer storage device") used as the slave device among the drives.

The peer drive may issue a completion interrupt or a completion signal for the write command, the read command, or the RAID rebuild command (or data rebuild command) to the master drive. For example, according to at least some example embodiments of the inventive concepts, the completion interrupt may be an MSI-X interrupt defined in the specification of NVM Express Revision 1.2.1 disclosed on Jun. 5, 2016. The MSI-X interrupt may be referred to as a pin-based or MSI interrupt.

The master drive which receives the completion interrupt from the peer drive may process the completion interrupt for itself. For example, the master drive may update a value of a completion queue Head Doorbell register of the peer drive to a new value based on the completion interrupt.

Figure 6:
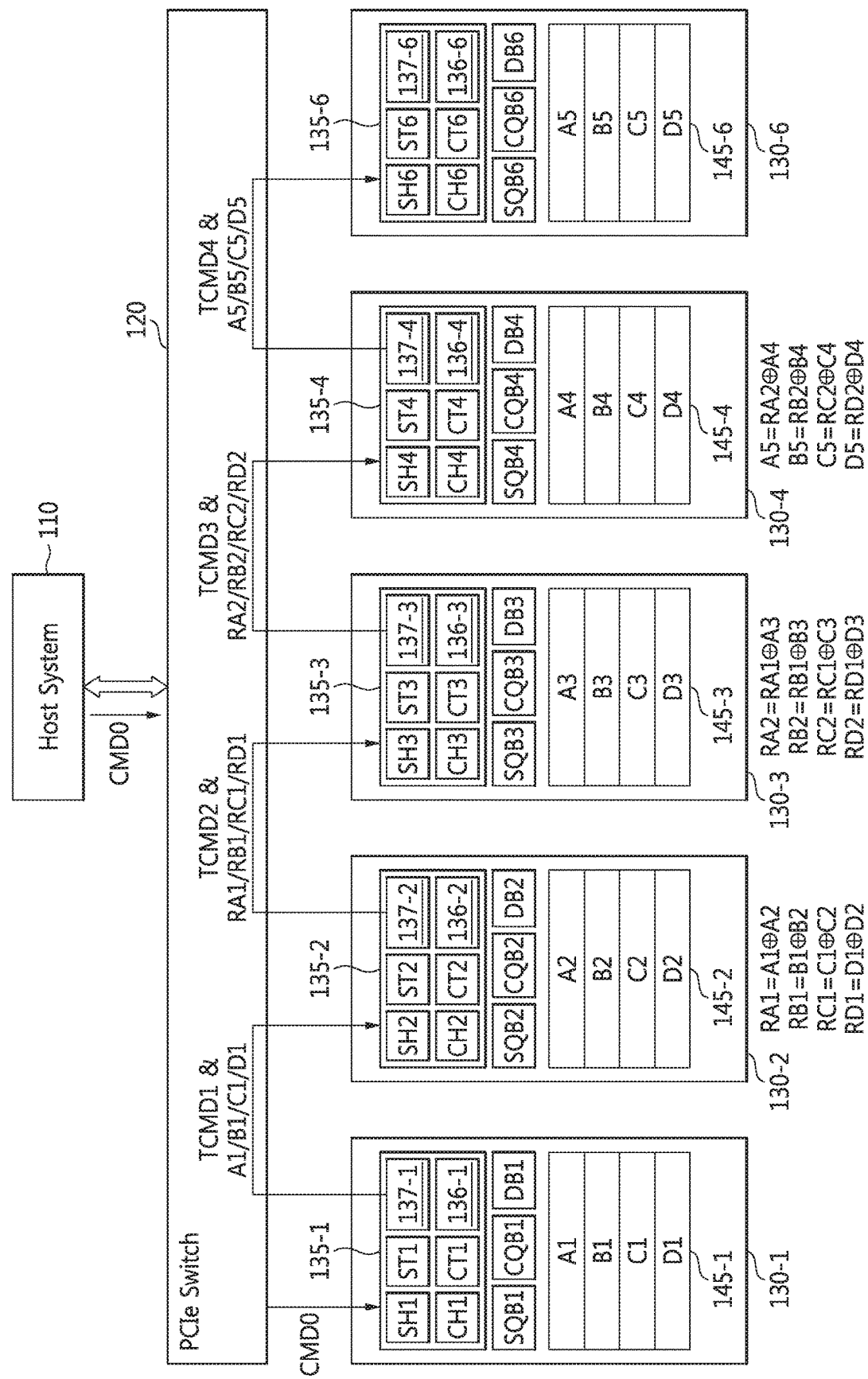
FIG. 6 is a schematic block diagram of the RAID system according to at least some example embodiments of the inventive concepts.
Figure 7:
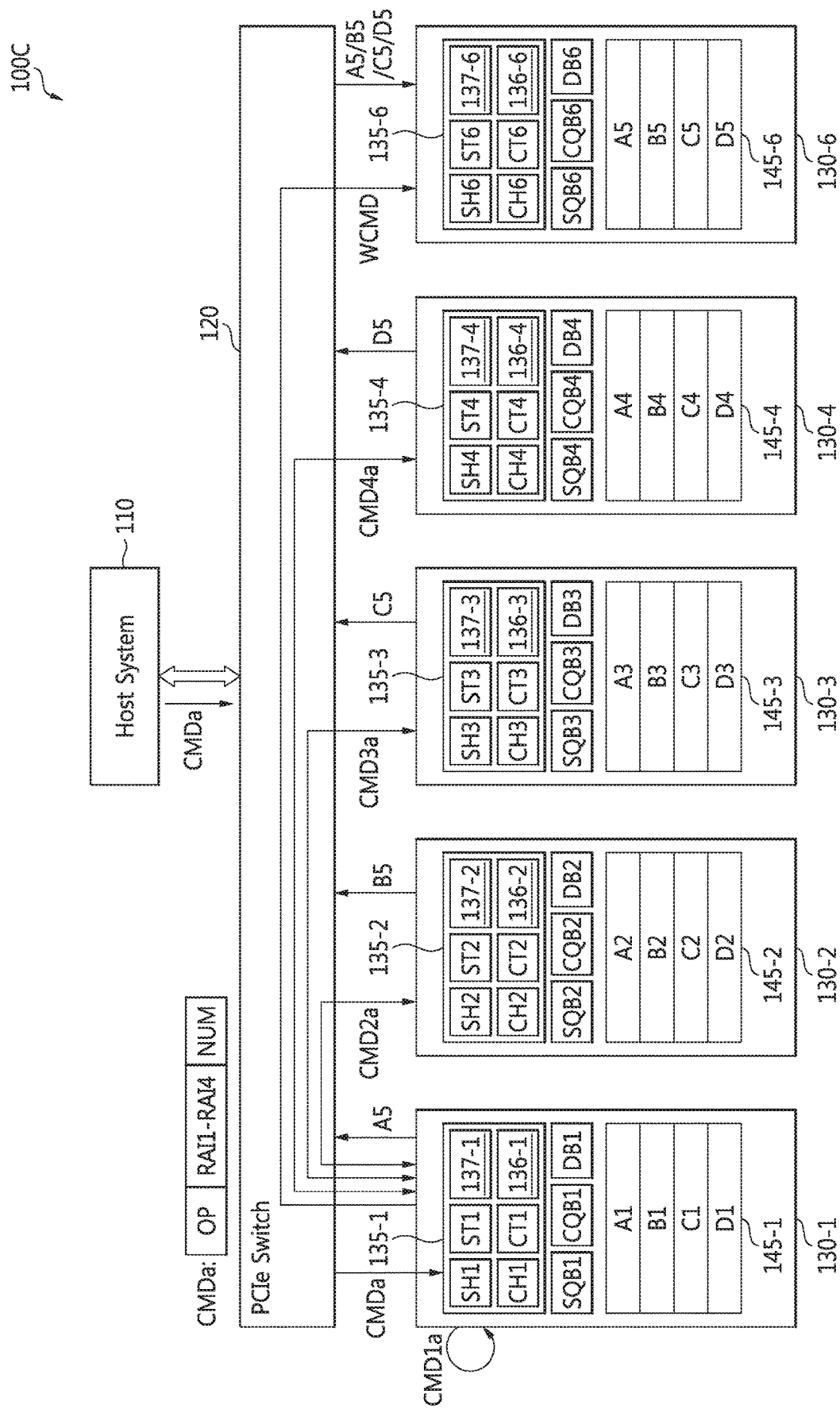
FIG. 7 is a schematic block diagram of the RAID system according to at least some example embodiments of the inventive concepts.

For example, as shown in FIG. 1, when a host system 110 is used as a master device, a first drive 130-1 may be used as a slave drive. In addition, the first drive 130-1 may be used as a master drive for issuing a command to each of drives 130-2, 130-3, 130-4, and 130-6. Moreover, as shown in FIG. 6 or 7, when the first drive 130-1 is used as a master drive, a second drive 130-2 may be used as a slave drive (or peer drive) and, when the second drive 130-2 is used as a master drive, a third drive 130-3 may be used as a slave drive (or peer drive).

In other words, the second drive 130-2 may be used as a peer drive for executing a command issued by the first drive 130-1, and may be used as a master drive for creating a command to be issued to the third drive 130-3.

According to at least some example embodiments of the inventive concepts, the term peer-to-peer (or drive-to-drive) communications, as used in the present disclosure, may refer to communications between a drive functioning as a master drive and a drive functioning as a slave drive. Accordingly, each of the drives 130-1 to 130-6 according to at least some example embodiments of the inventive concepts, unlike a drive of the related art, may be a drive capable of performing the peer-to-peer communications which will be described in the present specification.

FIG. 1 is a schematic block diagram of a redundant array of independent/inexpensive disks (RAID) system according to at least some example embodiments of the inventive concepts. Referring to FIG. 1, a RAID system (or a data storage system) 100A includes the host system 110, a PCIe switch (or bus) 120, and a plurality of drives 130-1 to 130-4, and 130-6. For example, a defect drive (or combined storage device) 130-5 is replaced with a rebuild drive (or source storage device) 130-6 for RAID rebuilding (RAID correction or data correction). According to at least some example embodiments of the inventive concepts, the rebuild drive 130-6 may be a replacement drive. For example, each of the plurality of drives 130-1 to 130-4, and 130-6 may be used as a master device of the PCIe switch 120.

The term "drive," as used in in the present disclosure, may refer to a disc or disk, computer data storage, storage, a data storage drive, a data storage device, and/or a storage device.

The RAID system 100A may be used as a server for storing important data, and may be used to store data in a data sensor or an internet data center. According to at least some example embodiments of the inventive concepts, the host system 110 may include, or be embodied by, a central processing unit (CPU), a RAID controller, and/or a server; however, the host system 110 is not limited to the above-referenced examples. According to at least some example embodiments of the inventive concepts, the RAID rebuild or the data rebuild may be a data reconstruction process that occurs when one of drives (or storage devices) configured in accordance with a RAID scheme (or a data storage system) fails. According to at least some example embodiments of the inventive concepts, RAID systems described in the present disclosure (e.g., RAID systems 100A-100E) are capable of storing data in accordance with any or all of a plurality of RAID schemes, including, for example, standard RAID levels 0-6.

Figure 8:
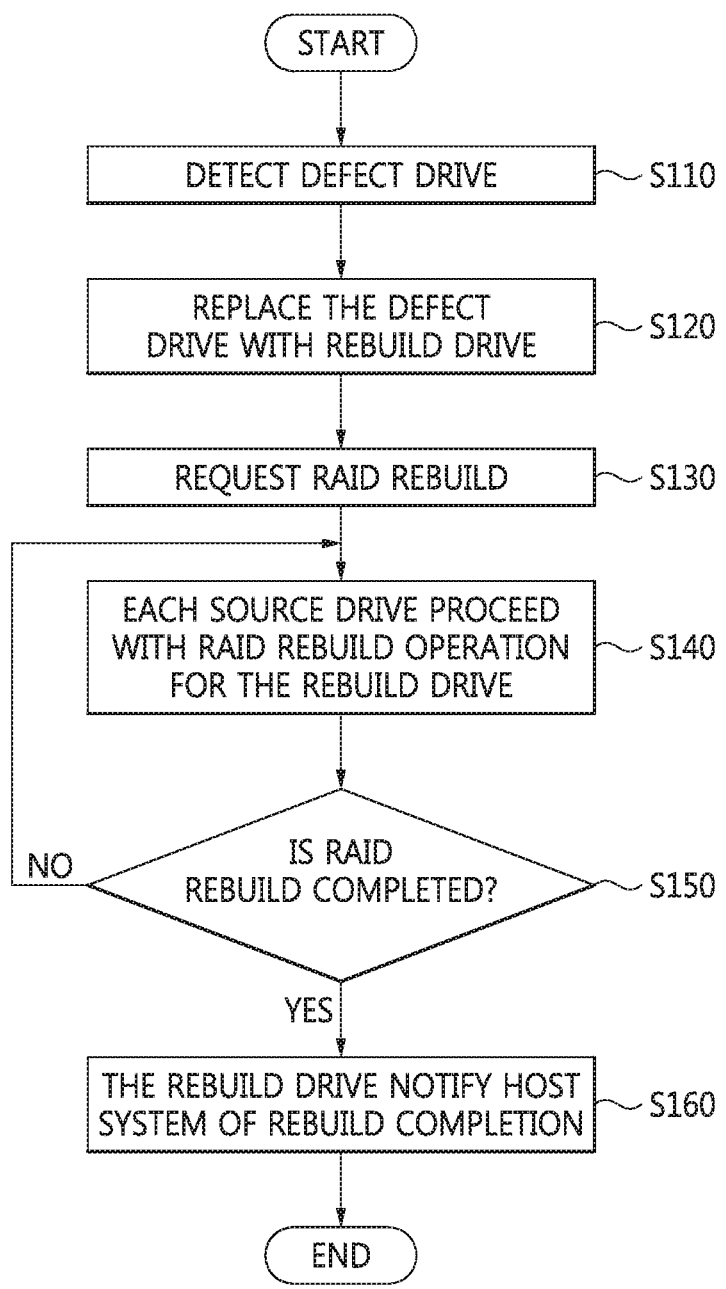
FIG. 8 is a flowchart which describes an operation of the RAID system shown in FIG. 1.

FIG. 8 is a flowchart which describes an operation of the RAID system shown in FIG. 1. Referring to FIGS. 1 and 8, the host system 110 detects that there is a defect in the drive 130-5 among drives 130-1 to 130-5 of the RAID system 100A (S110).

Figure 9:
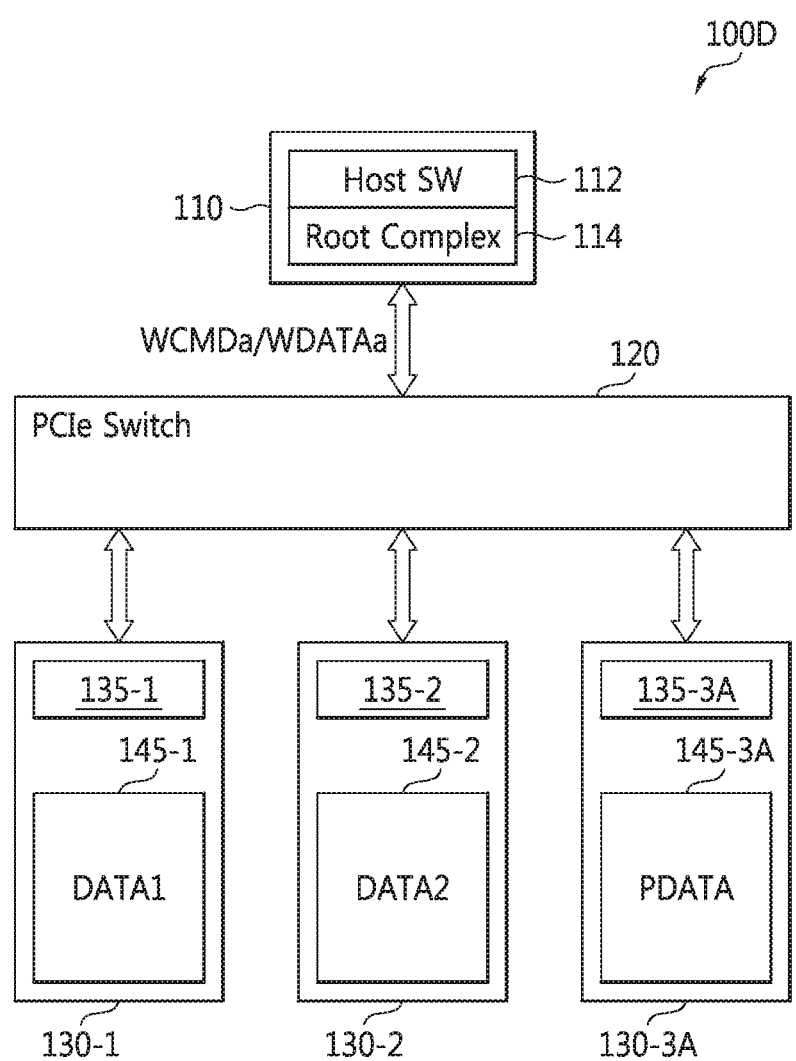
FIG. 9 is a block diagram which describes a write operation of the RAID system according to at least some example embodiments of the inventive concepts.
Figure 10:
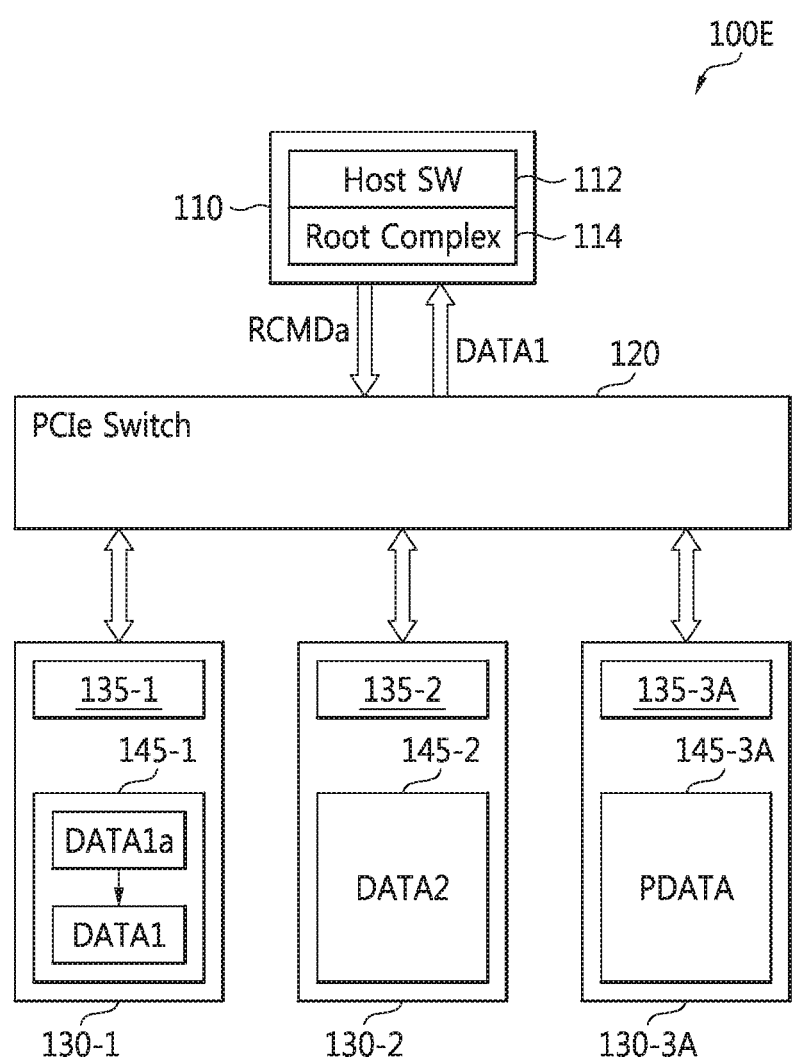
FIG. 10 is a block diagram which describes a read operation of the RAID system according to at least some example embodiments of the inventive concepts.

The host system 110 may load and execute host software 112 and may include a root complex 114, as shown in FIGS. 9 and 10. For example, NVM Express (NVMe) is a collection of standards defining interfaces that, for example, allow the host software 112 to communicate with a non-volatile memory sub-system. Examples of NVMe standards include NVM Express (e.g., the NVM Express revision 1.2.1 specification) and NVMe over Fabrics (e.g., the NVM Express over Fabrics specification revision 1.0). The host software 112 creates queues up to, for example, a desired number of queues or, alternatively, a maximum number of queues supported by a controller of each drive. Example of According to at least some example embodiments of the inventive concepts, in PCI Express (PCIe), the root complex 114 may be a device connecting a processor and a memory sub-system to a PCIe switch (or PCIe switch fabric) 120 configured by one or more switch devices. According to at least some example embodiments of the inventive concepts, the processor may be a processor of the host system 110 capable of executing the host software 112, and the memory sub-system may be a memory sub-system including the plurality of drives 130-1 to 130-4, and 130-6. For example, the root complex 114 may be a platform control hub (PCH).

After the defect drive 130-5 is physically replaced with the rebuild drive 130-6 (S120), the host system 110 transmits a RAID rebuild command of the rebuild drive 130-6 to each of the drives 130-1 to 130-4 through the PCIe switch 120 (S130). Each of the drives 130-1 to 130-4 transmits a response (or completion interrupt) to the RAID rebuild command to the host system 110 through the PCIe switch 120.

Each of the drives 130-1 to 130-4 proceeds (or performs) with a RAID (or data) rebuild operation for the rebuild drive 130-6 for itself without intervention of the host system 110 (S140). As shown in FIGS. 6 and 7, the host system 110 transmits only a RAID (or data) rebuild command (CMD0 or CMDa) triggering a start of the RAID rebuild operation to each one of the drives 103-1 to 130-4, and the peer-to-peer communications among the drives 130-1 to 130-4 for creating rebuild data is initiatively performed by each of the drives 130-1 to 130-4 for itself without the intervention of the host system 110.

According to at least some related art methods, the RAID rebuild operation for the rebuild drive 130-6 is performed by the host software 112 of the host system 110, and thus a substantial amount of computing resources of the host system 110 may be used. Accordingly, data processing performance of the host system 110 during the RAID rebuild operation was degraded, and RAID rebuild time was long.

However, in the RAID system 100A according to at least some example embodiments of the inventive concepts, each of the drives 130-1 to 130-4 initiatively proceeds with the RAID rebuild operation for the rebuild drive 130-6 for itself without the intervention of the host system 110 (S140). That is, each of rebuild data A5, B5, C5, and D5 rebuilt by each of the drives 130-1 to 130-4 is transmitted and stored in the rebuild drive 130-6 through the PCIe switch 120. Accordingly, use of the computing resources of the host system 110 is reduced or, alternatively, minimized, and thereby the data processing performance of the host system 110 is enhanced and the RAID rebuild time is reduced.

Until the RAID rebuild operation for the rebuild drive 130-6 is completed (NO in S150), each of the drives 130-1 to 130-4 proceeds with the RAID rebuild operation for the rebuild drive 130-6 (S140). When the RAID rebuild operation is completed (YES in S150), the rebuild drive 130-6 transmits a RAID rebuild completion to the host system 110 through the PCIe switch 120.

The drives 130-1 to 130-4 which store source data for the RAID (or data) rebuild operation among the plurality of drives (or the plurality of storage devices) 130-1 to 130-4 and 130-6 and the rebuild drive (or rebuild storage device) 130-6 which stores the rebuild data A5, B5, C5, and D5 are connected to the PCIe switch 120. According to at least some example embodiments of the inventive concepts, each of the drives 130-1 to 130-4 may be a source drive or a source storage device.

Each of the drives 130-1 to 130-4 and 130-6 may be a PCIe device, an NVM Express (NVMe) drive, an NVMe solid state drive (SSD), or a hard disk drive. The source drives 130-1 to 130-4 may transmit or receive data (or source data) necessary for RAID rebuilding to or from each other through the PCIe switch 120 by the peer-to-peer communications to perform the RAID rebuild operation for the rebuild drive 130-6. That is, each of the source drives 130-1 to 130-4 may perform the peer-to-peer communications, which will be described in the present disclosure, for itself without the intervention of the host system 110.

The host system 110 may transmit each of RAID rebuild commands CMDi (where i is 1, 2, 3, or 4) to each of the source drives 130-1 to 130-4 through the PCIe switch 120 for the RAID rebuild operation. The RAID rebuild command CMDi may include an operation code OPi instructing execution of the RAID rebuild operation, rebuild allocation information (RAIi), and the number (or information on the number; NUM) of source drives 130-1 to 130-4 necessary for RAID rebuilding.

First rebuild allocation information (RAIi, i=1) included in a first RAID rebuild command (CMDi, i=1) is information which identifies data allocated (or a memory region selected) to be rebuilt by the first drive 130-1, second rebuild allocation information (RAIi, i=2) included in a second RAID rebuild command (CMDi, i=2) is information which identifies data allocated (or a memory region selected) to be rebuilt by the second drive 130-2, third rebuild allocation information (RAIi, i=3) included in a third RAID rebuild command (CMDi, i=3) is information which identifies data allocated (or a memory region selected) to be rebuilt by the third drive 130-3, and fourth rebuild allocation information (RAIi, i=4) included in a fourth RAID rebuild command (CMDi, i=4) is information which identifies data allocated (or a memory region selected) to be rebuilt by a fourth drive 130-4.

According to at least one example embodiment of the inventive concepts, each piece of the rebuild allocation information (RAIi, i=1, 2, 3, 4, or 6) may include positional information (for example, an address) of a controller memory buffer. For example, each piece of the rebuild allocation information (RAIi, i=1, 2, 3, 4, or 6) may include positional information (for example, an address) of the submission queue, the completion queue, the submission queue Head Doorbell register, the submission queue Tail Doorbell register, the completion queue Head Doorbell register, the completion queue Tail Doorbell register, and/or the data buffer.

It is assumed that the number NUM of the drives 130-1 to 130-4 functioning as source drives necessary for RAID rebuilding is four in the example illustrated in FIG. 1. Accordingly, each piece of the rebuild allocation information RAI1 to RAI4 includes information on data stored in which of four divided memory regions needs to be rebuilt in each of the drives 130-1 to 130-4. In other words, each piece of the rebuild allocation information RAI1 to RAI4 includes information on which memory region the data stored in is used for rebuilding rebuild data A5.

For example, first rebuild allocation information RAI1 instructs a rebuild of data stored in a first memory region among the four divided memory regions in each of the drives 130-1 to 130-4, second rebuild allocation information RAI2 instructs a rebuild of data stored in a second memory region among the four divided memory regions in each of the drives 130-1 to 130-4, third rebuild allocation information RAI3 instructs a rebuild of data stored in a third memory region among the four divided memory regions in each of the drives 130-1 to 130-4, and fourth rebuild allocation information RAI4 instructs a rebuild of data stored in a fourth memory region among the four divided memory regions in each of the drives 130-1 to 130-4.

With respect to the example shown in FIG. 1, it is assumed that data A5 stored in the defect drive 130-5, that is, data A5 stored in a first memory region among four divided memory regions in the defect drive 130-5, may be rebuilt using each piece of data A1, A2, A3, and A4 stored in the first memory region among the four divided memory regions in each of the source drives 130-1 to 130-4.

In addition, data B5 stored in a second memory region of the defect drive 130-5 may be rebuilt using data B1, B2, B3, and B4 stored in the second memory region of each of the source drives 130-1 to 130-4, and data C5 stored in a third memory region of the defect drive 130-5 may be rebuilt using data C1, C2, C3, and C4 stored in the third memory region of each of the source drives 130-1 to 130-4, and data D5 stored in a fourth memory region of the defect drive 130-5 may be rebuilt using data D1, D2, D3, and D4 stored in the fourth memory region of each of the source drives 130-1 to 130-4.

Moreover, in the example shown in FIG. 1, it is assumed that memory regions 145-1 to 145-4, included in memories 140-1 to 140-4 of the source drives 130-1 to 130-4, each have the same size or the same number of logical block addresses (LBA).

The first source drive 130-1 may determine that data to be rebuilt by the first source drive 130-1 is the data A5 stored in the first memory region of the defect drive 130-5 based on the first rebuild allocation information RAI1 and the number NUM.

The second source drive 130-2 may determine that data to be rebuilt by the second source drive 130-2 is the data B5 stored in the second memory region of the defect drive 130-5 based on the second rebuild allocation information RAI2 and the number NUM.

The third source drive 130-3 may determine that data to be rebuilt by the third source drive 130-3 is the data C5 stored in the third memory region of the defect drive 130-5 based on the third rebuild allocation information RAI3 and the number NUM.

The fourth source drive 130-4 may determine that data to be rebuilt by the fourth source drive 130-4 is the data D5 stored in the fourth memory region of the defect drive 130-5 based on the fourth rebuild allocation information RAI4 and the number NUM.

For example, according to at least some example embodiments of the inventive concepts, each of controllers 135-1 to 135-4 of each of the source drives 130-1 to 130-4 divides each of the memory regions 145-1 to 145-4 of each of the memories 140-1 to 140-4, or the total number of LBAs corresponding to each of the memory regions 145-1 to 145-4, by the number (NUM=4).

A first controller 135-1 divides a memory region 145-1 or the number of total LBAs corresponding to the memory region 145-1 by four based on a first RAID rebuild command CMD1, a second controller 135-2 divides a memory region 145-2 or the total number of LBAs corresponding to the memory region 145-2 by four based on a second RAID rebuild command CMD2, a third controller 135-3 divides a memory region 145-3 or the total number of LBAs corresponding to the memory region 145-3 by four based on a third RAID rebuild command CMD3, and a fourth controller 135-4 divides a memory region 145-4 or the total number of LBAs corresponding to the memory region 145-4 by four based on a fourth RAID rebuild command CMD4.

The first controller 135-1 determines that the rebuild data A5 needs to be rebuilt using data A1, A2, A3, and A4 stored in the first memory region of each of the memory regions 145-1, 145-2, 145-3 and 145-4 based on the first rebuild allocation information RAI1 and the number NUM.

The second controller 135-2 determines that the rebuild data B5 needs to be rebuilt using data B1, B2, B3, and B4 stored in the second memory region of each of the memory regions 145-1, 145-2, 145-3, and 145-4 based on the second rebuild allocation information RAI2 and the number NUM.

The third controller 135-3 determines that the rebuild data C5 needs to be rebuilt by using data C1, C2, C3, and C4 stored in the third memory region of each of the memory regions 145-1, 145-2, 145-3, and 145-4 based on the third rebuild allocation information RAI3 and the number NUM.

The fourth controller 135-4 determines that the rebuild data D5 needs to be rebuilt by using data D1, D2, D3, and D4 stored in the fourth memory region of each of the memory regions 145-1, 145-2, 145-3, and 145-4 based on the fourth rebuild allocation information RAI4 and the number NUM.

The first drive 130-1 includes the first controller 135-1, a first submission queue SQB1, a first completion queue CQB1, a first data buffer DB1, and a first memory 140-1.

The first controller 135-1 may include a first submission queue Head Doorbell register SH1, a first submission queue Tail Doorbell register ST1, a first completion queue Head Doorbell register CH1, a first completion queue Tail Doorbell register CT1, a first control logic circuit 136-1, and a first hardware XOR gate circuit 137-1. The first hardware XOR gate circuit 137-1 is illustrated in FIG. 1; however, the first hardware XOR gate circuit 137-1 may be replaced with a software XOR gate executed by the first control logic circuit 136-1.

According to at least some example embodiments of the inventive concepts, a first controller memory buffer included in the first drive 130-1 may include at least two of the first submission queue SQB1, the first completion queue CQB1, the first data buffer DB1, the first submission queue Head Doorbell register SH1, the first submission queue Tail Doorbell register ST1, the first completion queue Head Doorbell register CH1, and the first completion queue Tail Doorbell register CT1.

The second drive 130-2 includes the second controller 135-2, a second submission queue SQB2, a second completion queue CQB2, a second data buffer DB2, and a second memory 140-2. The second controller 135-2 may include a second submission queue Head Doorbell register SH2, a second submission queue Tail Doorbell register ST2, a second completion queue Head Doorbell register CH2, a second completion queue Tail Doorbell register CT2, a second control logic circuit 136-2, and a second hardware XOR gate circuit 137-2. The second hardware XOR gate circuit 137-2 is illustrated in FIG. 1; however, the second hardware XOR gate circuit 137-2 may be replaced with a software XOR gate executed by the second control logic circuit 136-2.

According to at least some example embodiments of the inventive concepts, a second controller memory buffer included in the second drive 130-2 may include at least two of the second submission queue SQB2, the second completion queue CQB2, the second data buffer DB2, the second submission queue Head Doorbell register SH2, the second submission queue Tail Doorbell register ST2, the second completion queue Head Doorbell register CH2, and the second completion queue Tail Doorbell register CT2.

The third drive 130-3 includes the third controller 135-3, a third submission queue SQB3, a third completion queue CQB3, a third data buffer DB3, and the third memory 140-3. The third controller 135-3 may include a third submission queue Head Doorbell register SH3, a third submission queue Tail Doorbell register ST3, a third completion queue Head Doorbell register CH3, a third completion queue Tail Doorbell register CT3, a third control logic circuit 136-3, and a third hardware XOR gate circuit 137-3. The third hardware XOR gate circuit 137-3 is illustrated in FIG. 1; however, the third hardware XOR gate circuit 137-3 may be replaced with a software XOR gate executed by the third control logic circuit 136-3.

According to at least some example embodiments of the inventive concepts, a third controller memory buffer included in the third drive 130-3 may include at least two of the third submission queue SQB3, the third completion queue CQB3, the third data buffer DB3, and the third submission queue Head Doorbell register SH3, the third submission queue Tail Doorbell register ST3, the third completion queue Head Doorbell register CH3, and the third completion queue Tail Doorbell register CT3.

Each of drives 130-4, 130-5, and 130-6 includes each of controllers 135-4, 135-5, and 135-6, each of submission queues SQB4, SQB5, and SQB6, each of completion queues CQB4, CQB5, and CQB6, each of data buffers DB4, DB5, and DB6, and each of memories 140-4, 140-5, and 140-6. Each of the controllers 135-4, 135-5, and 135-6 may include each of submission queue Head Doorbell registers SH4, SH5, and SH6, each of submission queue Tail Doorbell registers ST4, ST5, and ST6, each of completion queue Head Doorbell registers CH4, CH5, and CH6, each of completion queue Tail Doorbell registers CT4, CT5, and CT6, each of control logic circuits 136-4, 136-5, and 136-6, and each of hardware XOR gate circuit 137-4, 137-5, and 137-6. Each of the hardware XOR gate circuits 137-4, 137-5, and 137-6 is illustrated in FIG. 1; however, each of the hardware XOR gate circuits 137-4, 137-5, and 137-6 may be replaced with a software XOR gate executed by each of the control logic circuits 136-4, 136-5, and 136-6.

According to at least some example embodiments of the inventive concepts, each controller memory buffer included in each of the drives 130-4, 130-5, and 130-6 has the same structure as, or a similar structure to, the first controller memory buffer.

That is, according to at least some example embodiments of the inventive concepts, each of the drives 130-1 to 130-6 has the same or similar structure and function, each of the submission queues SQB1 to SQB6 has the same or similar structure and function, each of the completion queues CQB1 to CQB6 has the same or similar structure and function, each of the data buffers DB4, DB5, and DB6 has the same or similar structure and function, each of the submission queue Head Doorbell registers SH1 to SH6 has the same or similar structure and function, each of the submission queue Tail Doorbell registers ST1 to ST6 has the same or similar structure and function, each of the completion queue Head Doorbell registers CH1 to CH6 has the same or similar structure and function, each of the completion queue Tail Doorbell registers CT1 to CT6 has the same or similar structure and function, each of the control logic circuits 136-1 to 136-6 has the same or similar structure and function, and each of the hardware XOR gate circuits 137-1 to 137-6 has the same or similar structure and function. According to at least some example embodiments of the inventive concepts, each of the control logic circuits 136-1 to 136-6 may be, for example, a processor, a microprocessor, a processor core, a multi-core processor, a multiprocessor, or a CPU.

Each of the memories 140-1 to 140-6 may be embodied in a non-volatile memory device, for example, a NAND-type flash memory device. The NAND-type flash memory device may include a memory cell array including a plurality of memory cells, and the memory cell array may be embodied in a two-dimensional structure or a three-dimensional structure. Each of the memories 140-1 to 140-6 may include at least one memory chip or a memory package.

Each of the submission queues SQB1 to SQB6, each of the completion queues CQB1 to CQB6, and each of the data buffers DB4, DB5, and DB6 may be embodied in a static random access memory (SRAM); however, the submission queues SQB1 to SQB6 are not limited to being embodied by SRAM.

Figure 2:
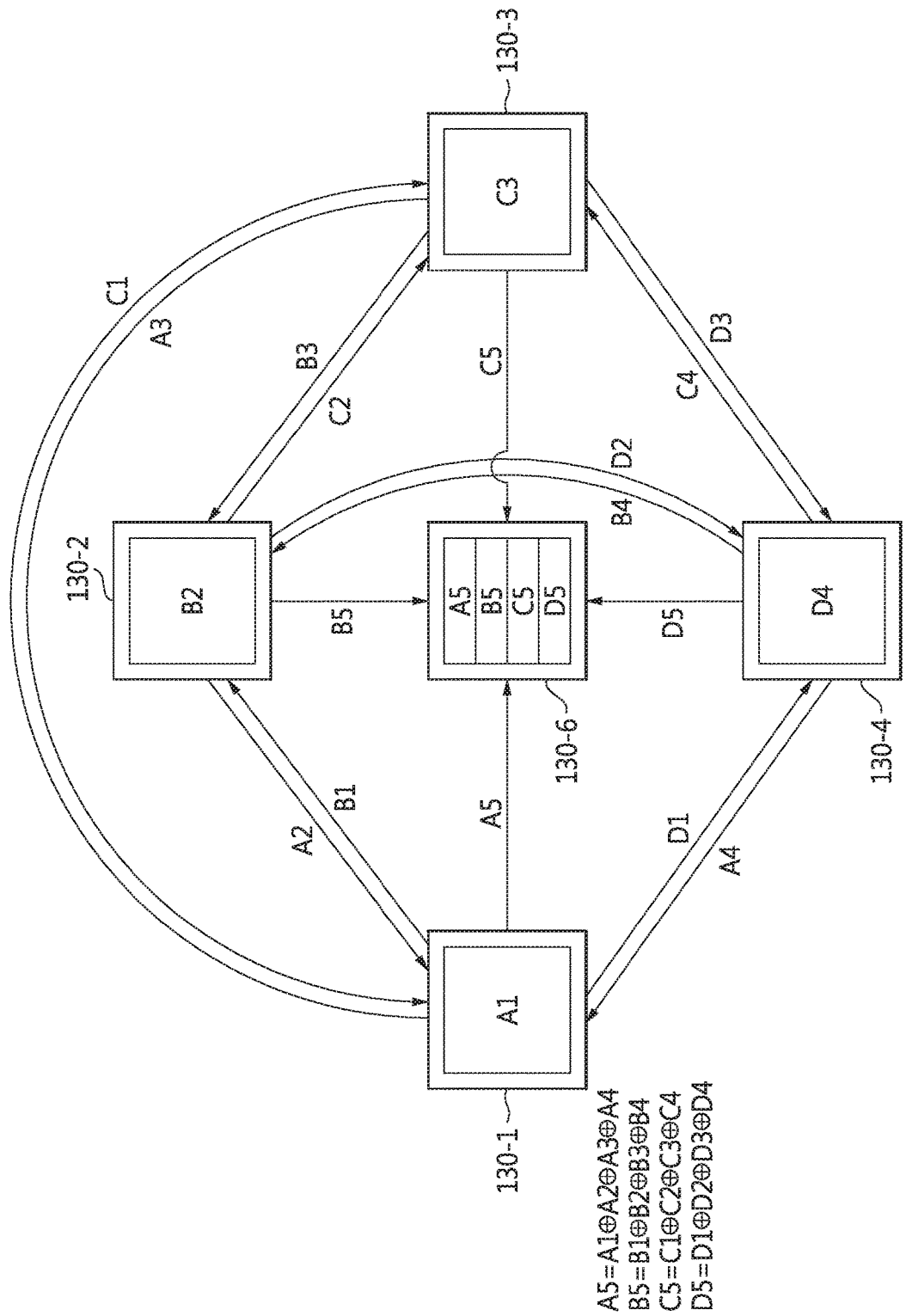
FIG. 2 is a conceptual diagram of a RAID rebuild operation according to at least some example embodiments of the inventive concepts, which is initiatively performed by each drive shown in FIG. 1.

Referring to FIG. 1, when the host system 110 is used as a master device of the first drive 130-1 and the first drive 130-1 is used as a master device of each of the drives 130-2, 130-3, 130-4, and 130-6, operations of the host system 110 and each of the drives 130-1 to 130-4, and 130-6 are as described below. The flow of each piece of data A2 to A4 transmitted through the peer-to-peer communications is as shown in FIG. 2.

The host system 110 creates the first RAID build command CMD1 which will be executed by the first drive 130-1. The first RAID build command CMD1 includes a first operation code OP1, the first rebuild allocation information RAI1, and the number NUM.

The host system 110 writes (or stores) the first operation code OP1 in an entry of the first submission queue SQB1, and writes (or stores) the first rebuild allocation information RAI1 and the number NUM in the first data buffer DB1. The host system 110 updates a value of the first submission queue Tail Doorbell register ST1 to a new value. For example, the host system 110 may update (or change) a value of the first submission queue Tail Doorbell register ST1 from zero to one.

The first control logic circuit 136-1 may read the first operation code OP1 from the first submission queue SQB1, and read the first rebuild allocation information RAI1 and the number NUM from the first data buffer DB1. The first control logic circuit 136-1 updates a value of the first submission queue Head Doorbell register SH1 to a new value. For example, the first control logic circuit 136-1 may update the value of the first submission queue Head Doorbell register SH1 from zero to one.

The first control logic circuit 136-1 determines that rebuild data A5 needs to be rebuilt using data A1, A2, A3, and A4 stored in the first memory region of each of the memory regions 145-1, 145-2, 145-3, and 145-4 based on the first rebuild allocation information RAI1 and the number NUM.

The first control logic circuit 136-1 creates each of read commands (for example, RCMD1 to RCMD4 of FIG. 3) for reading the data (A1, A2, A3, and A4) stored in the first memory region of each of the memory regions 145-1, 145-2, 145-3, and 145-4 based on the first operation code OP1, and transmits each of read commands RCMD2 to RCMD4 to each of the drives 130-2 to 130-4 through the PCIe switch 120. According to at least some example embodiments of the inventive concepts, each of operation codes for instructing execution of a read operation for each piece of data A2, A3, and A4 is included in each of the read commands RCMD2, RCMD3, and RCMD4.

The first control logic circuit 136-1 writes an operation code for instructing reading of data A2 in an entry of the second submission queue SQB2, and updates a value of the second submission queue Tail Doorbell register ST2 from 0 to 1.

The second control logic circuit 136-2 reads the operation code for instructing reading of data A2 from the second submission queue SQB2 and executes the operation code. The second control logic circuit 136-2 updates a value of the second submission queue Head Doorbell register SH2 from 0 to 1. The second control logic circuit 136-2 reads the data A2 based on the operation code and transmits the data A2 to the first drive 130-1 through the PCIe switch 120. The second control logic circuit 136-2 writes an indication signal (or indication bit) indicating a success of the read operation for the data A2.

The second control logic circuit 136-2 changes a value of the second completion queue Tail Doorbell register CT2 from 0 to 1. Then, the second control logic circuit 136-2 issues (or outputs) a completion interrupt (or completion signal) to the first control logic circuit 136-1 through the PCIe switch 120.

The first control logic circuit 136-1 reads the indication signal written in the second completion queue CQB2 based on the completion interrupt issued by the second control logic circuit 136-2 and changes a value of the second completion queue Head Doorbell register CH2 from 0 to 1.

The first control logic circuit 136-1 writes an operation code for instructing reading of data A3 in an entry of the third submission queue SQB3 and updates a value of the third submission queue Tail Doorbell register ST3 from 0 to 1.

The third control logic circuit 136-3 reads the operation code for instructing reading of the data A3 from the third submission queue SQB3 and executes the operation code. The third control logic circuit 136-3 updates a value of the third submission queue Head Doorbell register SH3 from 0 to 1. The third control logic circuit 136-3 reads the data A3 based on the operation code and transmits the data A3 to the first drive 130-1 through the PCIe switch 120. The third control logic circuit 136-3 writes an indication signal indicating a success of the read operation for the data A3 in the third completion queue CQB3.

The third control logic circuit 136-3 changes a value of the third completion queue Tail doorbell register CT3 from 0 to 1. Then, the third control logic circuit 136-3 issues a completion interrupt to the first control logic circuit 136-1 through the PCIe switch 120.

The first control logic circuit 136-1 reads the indication signals written in the third completion queue CQB3 and changes a value of the third completion queue Head Doorbell register CH3 from 0 to 1 based on the completion interrupt issued by the third control logic circuit 136-3.

The first control logic circuit 136-1 writes an operation code for instructing reading of data A4 in an entry of the fourth submission queue SQB4 and updates a value of the fourth submission queue Tail Doorbell register ST4 from 0 to 1.

The fourth control logic circuit 136-4 reads the operation code for instructing reading of the data A4 from the fourth submission queue SQB4 and executes the operation code. The fourth control logic circuit 136-4 updates a value of the fourth submission queue Head Doorbell register SH4 from 0 to 1. The fourth control logic circuit 136-4 reads the data A4 based on the operation code and transmits the data A4 to the first drive 130-1 through the PCIe switch 120. The fourth control logic circuit 136-4 writes an indication signal indicating a success of the read operation for the data A4 in the fourth completion queue CQB4.

The fourth control logic circuit 136-4 changes a value of a fourth completion queue Tail Doorbell register CT4 from 0 to 1. Then, the fourth control logic circuit 136-4 issues a completion interrupt to the first control logic circuit 136-1 through the PCIe switch 120.

The first control logic circuit 136-1 reads the indication signal written in the fourth completion queue CQB4 and changes a value of the fourth completion queue Head Doorbell register CH4 from 0 to 1 based on the completion interrupt issued by the fourth control logic circuit 136-4.

The first control logic circuit 136-1 reads the data A1 using a read command RCMD1.

The first control logic circuit 136-1 transmits each piece of the data A1, A2, A3, and A4 to the first hardware XOR gate circuit 137-1. The first hardware XOR gate circuit 137-1 creates rebuild data A5 using each piece of the data A1, A2, A3, and A4. The first control logic circuit 136-1 may transmit a write command WCMD and the rebuild data A5 to the rebuild drive 130-6 through the PCIe switch 120.

For example, the first control logic circuit 136-1 writes an operation code for instructing writing of the rebuild data A5 in an entry of a sixth submission queue SQB6 and updates a value of a sixth submission queue Tail Doorbell register ST6 from 0 to 1.

A sixth logic circuit 136-6 reads the operation code for instructing writing of the rebuild data A5 from the sixth submission queue SQB6 and executes the operation code. The sixth control logic circuit 136-6 updates a value of a sixth submission queue Head Doorbell register SH6 from 0 to 1. The sixth control logic circuit 136-6 writes the rebuild data A5 in a first memory region based on the operation code and writes an indication signal indicating a success of the write operation of the rebuild data A5 in a sixth completion queue CQB6.

The sixth control logic circuit 136-6 changes a value of a sixth completion queue Tail Doorbell register CT6 from 0 to 1. Then, the sixth control logic circuit 136-6 issues a completion interrupt to the first control logic circuit 136-1 through the PCIe switch 120.

The first control logic circuit 136-1 reads the indication signal written in the sixth completion queue CQB6 and changes a value of the sixth submission queue Head Doorbell register SH6 from 0 to 1 based on the completion interrupt issued by the sixth control logic circuit 136-6.

According to at least some example embodiments of the inventive concepts, the first control logic circuit 136-1 writes an indication signal indicating a success of generating of the rebuild data A5 or a success of the writing of the rebuild data A5 in the first completion queue CQB1 based on the completion interrupt issued by at least one of the control logic circuits 136-1 to 136-4 and 136-6.

The first control logic circuit 136-1 changes a value of the first completion queue Tail Doorbell register CT1 from 0 to 1. Then, the first control logic circuit 136-1 issues a completion interrupt to the host system 110 through the PCIe switch 120.

The host system 110 reads the indication signal written in the first completion queue CQB1 and changes a value of the first completion queue Head Doorbell register CH1 from 0 to 1 based on the completion interrupt issued by the first control logic circuit 136-1.

As described above, the master drive 130-1 may create a read command RCMD2, RCMD3, or RCMD4 or a write command WCMD for itself based on data stored in the first submission queue SQB1, the first completion queue CQB1, and/or the first data buffer DB1, and issue (or output) the read command RCMD2, RCMD3, or RCMD4 or the write command WCMD to a peer drive 130-2, 130-3, 130-4, or 130-6.

The peer drive 130-2, 130-3, 130-4, or 130-6 may execute the read command RCMD2, RCMD3, or RCMD4 or the write command WCMD transmitted from the master drive 130-1 and transmit a completion interrupt (for example, MSI-interrupt) corresponding to a result of the execution to the master drive 130-1.

The master drive 130-1 may process the completion interrupt (for example, MSI-interrupt) for itself. That is, the master drive 130-1 may read an indication signal stored in a completion queue CQB2, CQB3, CQB4, or CQB6 of the peer drive 130-2, 130-3, 130-4, or 130-6, and update a value (for example, 0) of the completion queue Head Doorbell register CH2, CH3, CH4, or CH6 to a new value (for example, 1).

Since a process in which each of rebuild data B5, C5, and D5 is rebuilt (or created) by each of the drives 130-2, 130-3, and 130-4 is the same as or similar to a process in which the rebuild data A5 is rebuilt (or created) by the first drive 130-1, a detailed description of the process in which each of rebuild data B5, C5, and D5 is rebuilt (or created) by each of the drives 130-2, 130-3, and 130-4 is omitted.

Figure 3:
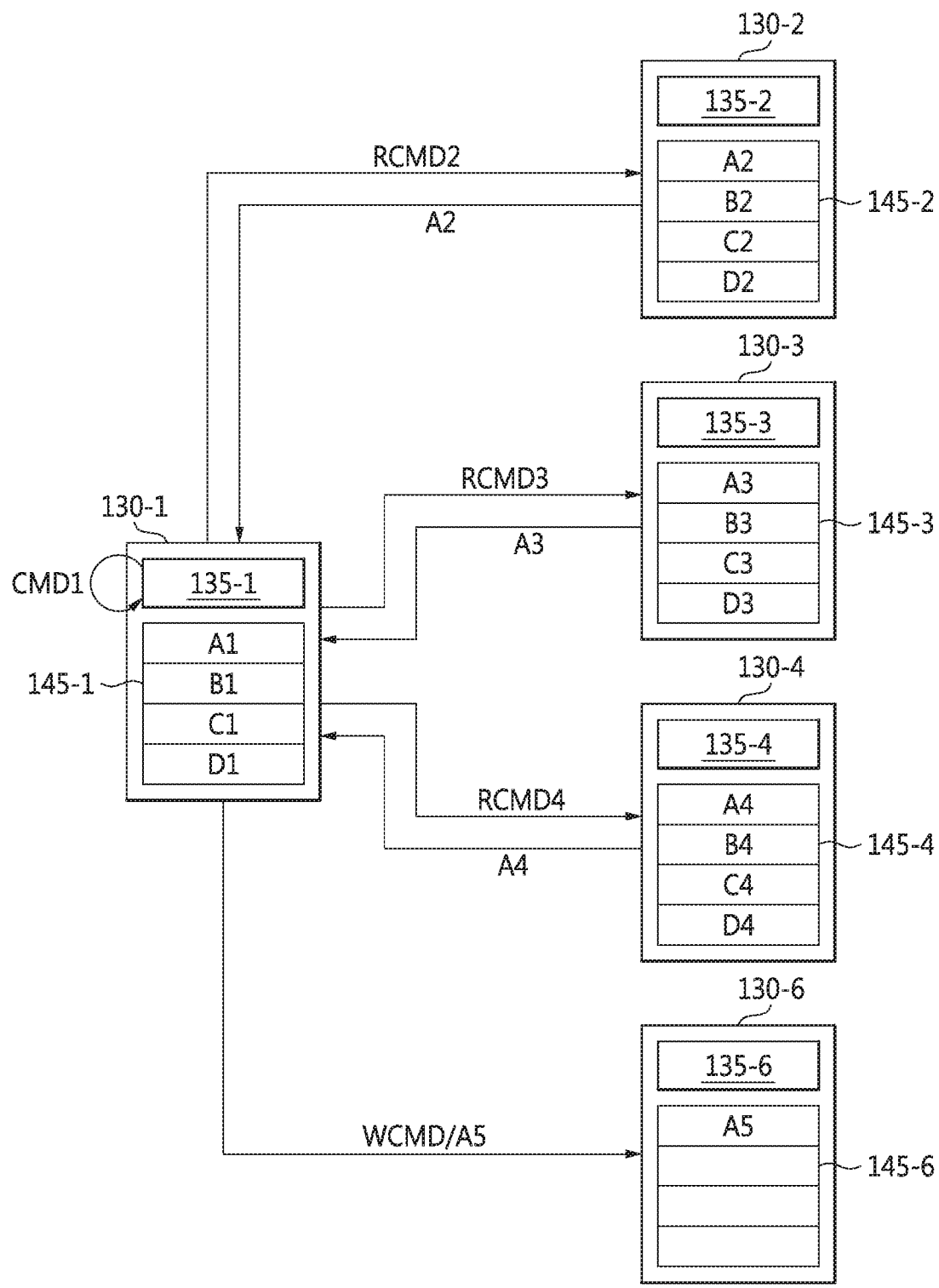
FIG. 3 is a conceptual diagram which describes a read operation and a write operation of a first drive for peer drives shown in FIG. 1.

FIG. 2 is a conceptual diagram which describes a RAID rebuild operation according to at least some example embodiments of the inventive concepts, which is initiatively performed by each of the drives shown in FIG. 1, and FIG. 3 is a conceptual diagram which describes a read operation and a write operation by the first drive for the peer drives shown in FIG. 1.

Referring to FIGS. 1 to 3, the first controller 135-1 of the first drive 130-1 responsible for a rebuild of the rebuild data A5 creates each of the read commands RCMD1 to RCMD4 based on the first rebuild command CMD1 and transmits each of the read commands RCMD2 to RCMD4 to each of the drives 130-2 to 130-4 through the PCIe switch 120. Each of the drives 130-2 to 130-4 reads each piece of the data A2, A3, and A4 from a first memory region of each of the memory regions 145-2, 145-3, and 145-4 in response to each of the read commands RCMD2 to RCMD4 and transmits each piece of the data A2, A3, and A4 to the first drive 130-1 through the PCIe switch 120.

For example, each of the read commands RCMD2 to RCMD4 may include a start LBA and the number of LBAs.

Moreover, the first controller 135-1 divides the memory region 145-1 into four memory regions based on the first rebuild command CMD1 and reads data A1 stored in a first memory region among the four divided memory regions.

The first controller 135-1 creates the rebuild data A5 using each piece of the data A1 to A4 and transmits a write command WCMD and the rebuild data A5 to the rebuild drive 130-6 through the PCIe switch 120. The rebuild drive 130-6 may write the rebuild data A5 in a first memory region of a memory region 145-6 based on the write command WCMD.

The second controller 135-2 of the second drive 130-2 responsible for a rebuild of rebuild data B5 creates read commands based on the second rebuild command CMD2 and transmits some of the read commands to the source drives 130-1, 130-3, and 130-4 through the PCIe switch 120. Each of the source drives 130-1, 130-3, and 130-4 reads each piece of data B1, B3, and B4 from a second memory region of each of the memory regions 145-1, 145-3, and 145-4 in response to each of the read commands, and transmits each piece of the data B1, B3, and B4 to the second drive 130-2 through the PCIe switch 120.

Moreover, the second controller 135-2 divides the memory region 145-2 into four memory regions based on the second rebuild command CMD2 and reads data B2 stored in a second memory region among the four divided memory regions.

The second controller 135-2 creates the rebuild data B5 using each piece of the data B1, B2, B3, and B4 and transmits a write command and the rebuild data B5 to the rebuild drive 130-6 through the PCIe switch 120. The rebuild drive 130-6 may write the rebuild data B5 in a second memory region of the memory region 145-6 based on the write command.

The third controller 135-3 of the third drive 130-3 responsible for a rebuild of the rebuild data C5 creates read commands based on the third rebuild command CMD3 and transmits some of the read commands to each of the source drives 130-1, 130-2, and 130-4 through the PCIe switch 120. Each of the source drives 130-1, 130-2, and 130-4 reads each piece of the data C1, C2, and C4 from a third memory region of each of the memory regions 145-1, 145-2, and 145-4 in response to each of the read commands, and transmits each piece of the data C1, C2, and C4 to the third drive 130-3 through the PCIe switch 120.

In addition, the third controller 135-3 divides the memory region 145-3 into four memory regions based on the third rebuild command CMD3 and reads data C3 stored in a third memory region among the four divided memory regions.

The third controller 135-3 creates the rebuild data C5 using each piece of the data C1, C2, C3, and C4 and transmits a write command and the rebuild data C5 to the rebuild drive 130-6 through the PCIe switch 120. The rebuild drive 130-6 may write the rebuild data C5 in a third memory region of the memory region 145-6 based on the write command.

The fourth controller 135-4 of the fourth drive 130-4 responsible for a rebuild of the rebuild data D5 creates read commands based on the fourth rebuild command CMD4 and transmits some of the read commands to each of the source drives 130-1, 130-2, and 130-3 through the PCIe switch 120. Each of the source drives 130-1, 130-2, and 130-3 reads each piece of the data D1, D2, and D3 from a fourth memory region of each of the memory regions 145-1, 145-2, and 145-3 in response to each of the read commands and transmits each piece of the data D1, D2, and D3 to the fourth drive 130-4 through the PCIe switch 120.

Moreover, the fourth controller 135-4 divides the memory region 145-4 into four memory regions based on the fourth rebuild command CMD4 and reads data D4 stored in a fourth memory region among the four divided memory regions.

The fourth controller 135-4 creates the rebuild data D5 using each piece of the data D1, D2, D3, and D4 and transmits a write command and the rebuild data D5 to the rebuild drive 130-6 through the PCIe switch 120. The rebuild drive 130-6 may write the rebuild data D5 in a fourth memory region of the memory region 145-6 based on the write command.

Figure 4:
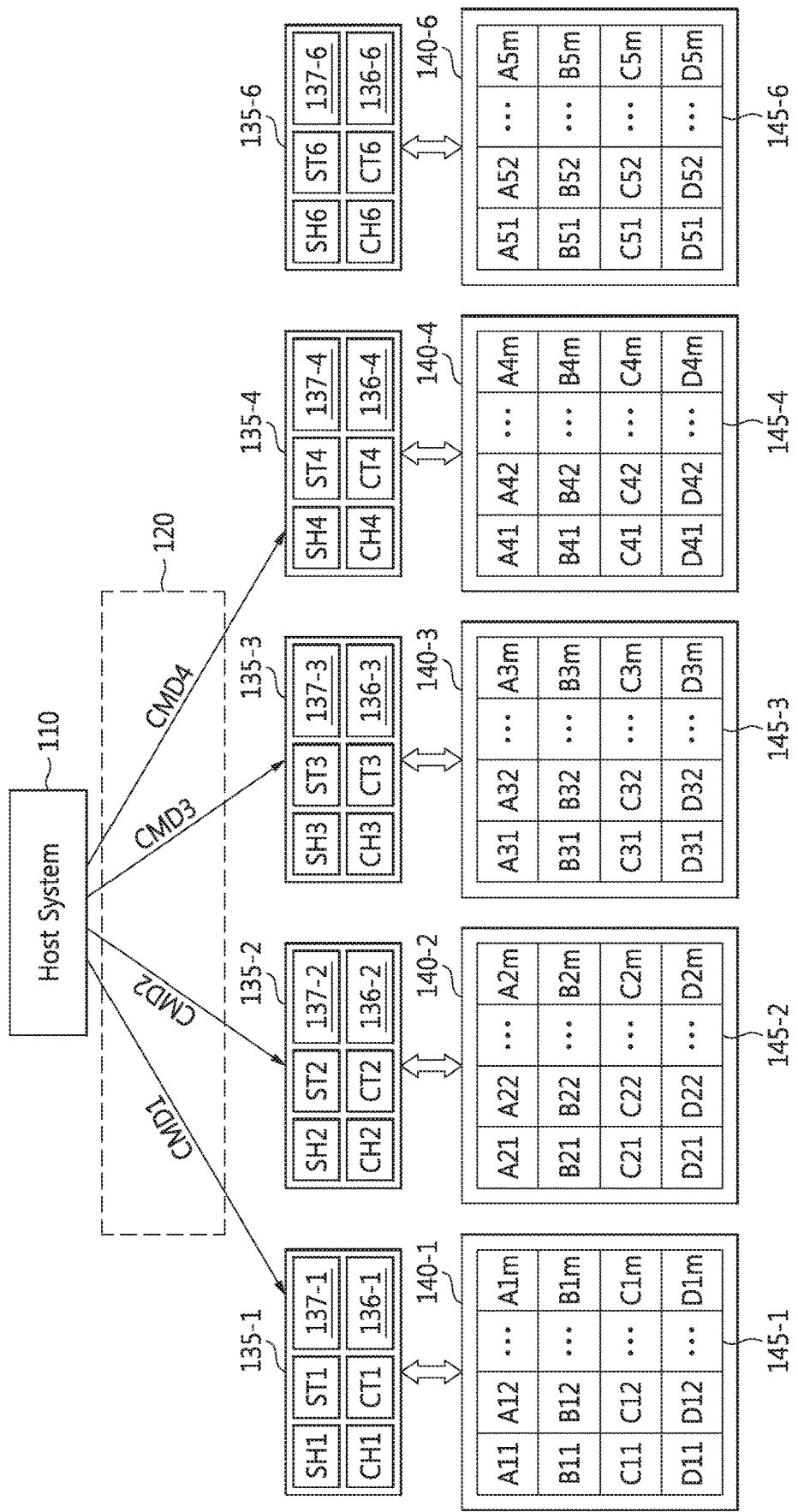
FIG. 4 is a specific block diagram of the RAID system shown in FIG. 1.

As shown in FIGS. 1 and 4, each of the controllers 135-1 to 135-4 may include a hardware XOR gate circuit 137-1, 137-2, 137-3, or 137-4. The first hardware XOR gate circuit 137-1 may perform an XOR operation on each piece of the data A1, A2, A3, and A4, and create the rebuild data A5 as a result of the XOR operation. The second hardware XOR gate circuit 137-2 may perform the XOR operation on each piece of the data B1, B2, B3, and B4 and create the rebuild data B5 as a result of the XOR operation. The third hardware XOR gate circuit 137-3 may perform an XOR operation on each piece of the data C1, C2, C3, and C4 and create the rebuild data C5 as a result of the XOR operation. The fourth hardware XOR gate circuit 137-4 may perform an XOR operation on each piece of the data D1, D2, D3, and D4, and create the rebuild data D5 as a result of the XOR operation.

Figure 5:
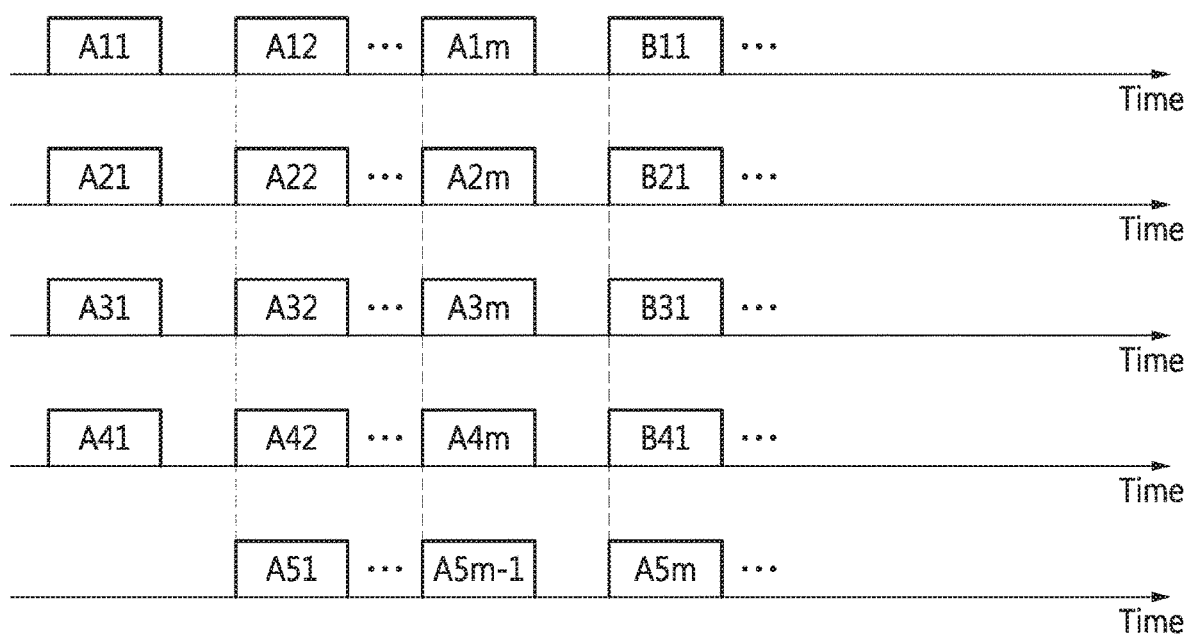
FIG. 5 is a conceptual diagram which describes a peer-to-peer distributed parallel RAID rebuild operation performed between drives included in the RAID system shown in FIG. 1.

FIG. 4 is a specific block diagram of the RAID system shown in FIG. 1, and FIG. 5 is a conceptual diagram which describes a peer-to-peer distributed parallel RAID rebuild operation performed between drives included in the RAID system shown in FIG. 1.

Referring to FIGS. 1 to 5, it is assumed that data Ai, where i is 1, 2, 3, 4, and 5, includes data sets Ai1 to Aim, data Bi includes data sets Bi1 to Bim, data Ci includes data sets Ci1 to Cim, and data Di includes data sets Di1 to Dim.

For example, the first drive 130-1 may create rebuild data A51 using each piece of data A11, A21, A31, and A41 and create rebuild data A5m using each piece of data A1m, A2m, A3m, and A4m.

The second drive 130-2 may create rebuild data B51 using each piece of data B11, B21, B31, and B41, the third drive 130-3 may create rebuild data C51 using each piece of data C11, C21, C31, and C41, and the fourth drive 130-4 may create rebuild data D51 using each piece of data D11, D21, D31, and D41.

Referring to FIG. 5, while the first drive 130-1 creates the rebuild data A51 or the rebuild drive 130-6 writes the rebuild data A51 in the memory region 145-6, the first drive 130-1 may read data A12 from the memory region 145-1 and may read each piece of data A22, A32, and A42 from each of the memory regions 145-2, 145-3, and 145-4 of the drives 130-2, 130-3, and 130-4.

While the first drive 130-1 creates rebuild data A5m-1 or the rebuild drive 130-6 writes the rebuild data A5m-1 in the memory region 145-6, the first drive 130-1 may read data A1m from the memory region 145-1 and may read each piece of data A2m, A3m, and A4m from each of the memory regions 145-2, 145-3, and 145-4 of the drives 130-2, 130-3, and 130-4.

In addition, while the first drive 130-1 creates the rebuild data A5m or the rebuild drive 130-6 writes the rebuild data A5m in the memory region 145-6, the first drive 130-1 may read data B11 from the memory region 145-1 and may read each piece of the data B21, B31, and B41 from each of the memory regions 145-2, 145-3, and 145-4 of the drives 130-2, 130-3, and 130-4.

In other words, the RAID system 100A may perform the peer-to-peer distributed parallel RAID rebuild operation performed between the drives 130-1 to 130-4 and 130-6.

FIG. 6 is a schematic block diagram of the RAID system according to at least some example embodiments of the inventive concepts. Referring to FIG. 6, a RAID system 100B may include the host system 110, the PCIe switch (or bus) 120, and a plurality of drives 130-1 to 130-4 and 130-6.

The host system 110 may transmit a RAID rebuild command CMD0 for a RAID rebuild operation to one (for example, the first drive 130-1 in FIG. 6) of the plurality of drives 130-1 to 130-4 and 130-6 through the PCIe switch 120.

For convenience of description, an example in which the RAID rebuild operation is sequentially performed among the drives 130-1 to 130-4 is shown in FIG. 6; however, an execution order of the RAID rebuild operation may be variously changed according to at least some example embodiments of the inventive concepts.

The first controller 135-1 of the first drive 130-1 transmits a first command TCMD1 and all of data A1, B1, C1, and D1 stored in the memory region 145-1 of the first memory 140-1 to the second controller 135-2 of the second drive 130-2 through the PCIe switch 120 in response to the RAID rebuild command CMD0. For example, the first command TCMD1 may include a type (for example, XOR operation) of an operation to be performed by the second controller 135-2, objects (for example, data to be operated) of the operation, and a destination (for example, a destination drive) to which a result of the operation is transmitted.

For example, the RAID rebuild command CMD0 may include positional information (for example, address) of each controller memory buffer included in each of the drives 130-1, 130-2, 130-3, 130-4, and 130-6 as described above. For example, the first command TCMD1 may include positional information (for example, address) of a controller memory buffer included in the second drive 130-2.

The second controller 135-2 reads all of data A2, B2, C2, and D2 stored in the memory region 145-2 of the second memory 140-2 in response to the first command TCMD1. The second hardware XOR gate circuit 137-2 of the second controller 135-2 performs an XOR operation on each piece of the data A1, B1, C1, and D1 and each piece of the data A2, B2, C2, and D2, and creates first operation data RA1, RB1, RC1, and RD1. The second controller 135-2 creates a second command TCMD2 based on the first command TCMD1 and transmits the second command TCMD2 and the first operation data RA1, RB1, RC1, and RD1 to the third controller 135-3 of the third drive 130-3 through the PCIe switch 120. The second command TCMD2 may include a type of an operation to be performed by the third controller 135-3, objects of the operation, and a destination to which a result of the operation is transmitted. For example, the second command TCMD2 may include positional information (for example, address) of a controller memory buffer included in the third drive 130-3.

The third controller 135-3 reads all of data A3, B3, C3, and D3 stored in the memory region 145-3 of the third memory 140-3 in response to the second command TCMD2. The third hardware XOR gate circuit 137-3 of the third controller 135-3 performs an XOR operation on each piece of the data RA1, RB1, RC1, and RD1 and each piece of the data A3, B3, C3, and D3, and creates second operation data RA2, RB2, RC2, and RD2. The third controller 135-3 creates a third command TCMD3 based on the second command TCMD2 and transmits the third command TCMD3 and the second operation data RA2, RB2, RC2, and RD2 to the fourth controller 135-4 of the fourth drive 130-4 through the PCIe switch 120. The third command TCMD3 may include a type of an operation to be performed by the fourth controller 135-4, objects of the operation, and a destination to which a result of the operation is transmitted. For example, the third command TCMD3 may include positional information (for example, address) of a controller memory buffer included in the fourth drive 130-3.

The fourth controller 135-4 reads all of data A4, B4, C4, and D4 stored in the memory region 145-4 of the fourth memory 140-4 in response to the third command TCMD3. The fourth hardware XOR gate circuit 137-4 of the fourth controller 135-4 performs an XOR operation on each piece of the data RA2, RB2, RC2, and RD2 and each piece of the data A4, B4, C4, and D4, and creates rebuild data A5, B5, C5, and D5. The fourth controller 135-4 creates a fourth command TCMD4 based on the third command TCMD3 and transmits the fourth command TCMD4 and the rebuild data A5, B5, C5, and D5 to a sixth controller 135-6 of the rebuild drive 130-6 through the PCIe switch 120. The fourth command TCMD4 includes information on a type of an operation to be performed by the sixth controller 135-6 and information on the memory region 145-6 in which the rebuild data A5, B5, C5, and D5 will be stored. For example, the fourth command TCMD4 may include positional information (for example, address) of a controller memory buffer included in the rebuild drive 130-6.

As described above, the positional information (for example, the address) of the memory buffer may include positional information (for example, the address) of at least two of a submission queue, a completion queue, a data buffer, a submission queue head register, a submission queue tail register, a completion queue head register, and a completion queue tail register.

The sixth controller 135-6 writes the rebuild data A5, B5, C5, and D5 in the memory region 145-6 based on the fourth command TCMD4. When the rebuild data A5, B5, C5, and D5 are completely written in the memory region 145-6, the sixth controller 135-6 may transmit a RAID rebuild completion through the PCIe switch 120.

As described referring to FIGS. 1 to 6, one (for example, a master drive) of the drives 130-1 to 130-4 of the RAID system 100A or 100B may create a read command for reading some or all of data stored in each of remaining drives for itself for RAID rebuilding, and transmit a created read command to each of the remaining drives (for example, peer drives 130-2, 130-3, and 130-4).

A first drive (for example, a master drive) of the drives 130-1 to 130-4 of the RAID system 100A or 100B may create a write command to write data in a second drive of the remaining drives (for example, peer drives 130-2, 130-3, and 130-4) for a RAID rebuild operation for itself, and transmit a created write command to the second drive.

FIG. 7 is a schematic block diagram of the RAID system according to at least some example embodiments of the inventive concepts. Referring to FIG. 1, a RAID system 100C may include the host system 110, the PCIe switch (or bus) 120, and the plurality of drives 130-1 to 130-4 and 130-6.

The host system 110 transmits a RAID rebuild command CMDa to the first drive 130-1 used (or determined) as a master drive through the PCIe switch 120. For example, the RAID rebuild command CMDa may include an operation code OP for instructing a RAID rebuild operation, each piece of rebuild allocation information RAI1 to RAI4, and the number NUM. As described above, each piece of the rebuild allocation information RAI1 to RAI4 may include positional information of each controller memory buffer included in each of the drives 130-1 to 130-4 and 130-6. As described above, the positional information of the memory buffer may include positional information (for example, address) of at least two of the submission queue, the completion queue, the data buffer, the submission queue head register, the submission queue tail register, the completion queue head register, and the completion queue tail register.

For example, the host system 110 may transmit positional information of each controller memory buffer included in each of the drives 130-1 to 130-4 and 130-6 to a master drive as preceding work to create a communication channel for peer-to-peer (or drive-to-drive) communications.

As described above, the host system 110 may write an operation code OP in the entry of the first submission queue SQB1, write each piece of the rebuild allocation information RAI1 to RAI4 and the number NUM in the first data buffer DB1, and update a value of the first submission queue Tail Doorbell register ST1 from 0 to 1. The first control logic circuit 136-1 reads the operation code OP from the first submission queue SQB1, reads each piece of the rebuild allocation information RAI1 to RAI4 and the number NUM from the first data buffer DB1, and updates a value of the first submission queue Head Doorbell register SH1 from 0 to 1.

The first control logic circuit 136-1 may create each of RAID rebuild commands CMD1a, CMD2a, CMD3a, and CMD4a based on the operation code OP, each piece of the rebuild allocation information RAI1 to RAI4, and the number NUM the same as (or similar to) each of the RAID rebuild commands CMD1 to CMD4 as described referring to FIG. 1. It is assumed that a data structure of a RAID rebuild command CMD1a is the same as or similar to a data structure of the first RAID rebuild command CMD1, a data structure of a RAID rebuild command CMD2a is the same as or similar to a data structure of the second RAID rebuild command CMD2, a data structure of a RAID rebuild command CMD3a is the same as or similar to a data structure of the third RAID rebuild command CMD3, and a data structure of a RAID rebuild command CMD4a is the same as or similar to a data structure of the fourth RAID rebuild command CMD4.

In other words, the first drive 130-1 shown in FIG. 7 may function as the host system 110 shown in FIG. 1. For example, the first drive 130-1 may be used as a master device of each of the drives 130-2, 130-3, 130-4, and 130-6.

For example, the first drive 130-1 functioning as a master device may create a write command, a read command, or the RAID rebuild command CMD1a, CMD2a, CMD3a, or CMD4a for itself using data stored in the first submission queue SQB1, the first completion queue CQB1, and/or the first data buffer DB1, and issue the write command, the read command, or the RAID rebuild command CMD2a, CMD3a, and CMD4a to each of the peer drives 130-2, 130-3, 130-4, and 130-6.

Each of the peer drives 130-2, 130-3, 130-4, and 130-6 may issue a completion interrupt for the write command, the read command, or the RAID rebuild command CMD2a, CMD3a, or CMD4a to the first drive 130-1. The first drive 130-1 receiving the completion interrupt from each of the peer drives 130-2, 130-3, 130-4, and 130-6 may process the completion interrupt for itself.

For example, in the same manner as or similar to described referring to FIGS. 2 and 3, the first drive 130-1 may read each piece of the data A2, A3, and A4 through each of the peer drives 130-2, 130-3, and 130-4 and the peer-topeer communications, rebuild the rebuild data A5 using data A1 stored in the first drive 130-1 and each piece of the data A2, A3, and A4 read by each of the peer drives 130-2, 130-3, and 130-4, and write the rebuild data A5 in the rebuild drive 130-6.

In the same manner as or similar to described referring to FIGS. 2 and 3, the second drive 130-2 may read each piece of data B1, B3, and B4 through each of the peer drives 130-1, 130-3, and 130-4 and the peer-to-peer communications, rebuild the rebuild data B5 using data B2 stored in the second drive 130-2 and each piece of the data B1, B3, and B4 read by each of the peer drives 130-1, 130-3, and 130-4, and write the rebuild data B5 in the rebuild drive 130-6.

In the same manner as or similar to described referring to FIGS. 2 and 3, the third drive 130-3 may read each piece of data C1, C2, and C4 through each of the peer drives 130-1, 130-2, and 130-4 and the peer-to-peer communications, rebuild the rebuild data C5 using data C3 stored in the third drive 130-3 and each piece of the data C1, C2, and C4 read by each of the peer drives 130-1, 130-2, and 130-4, and write the rebuild data C5 in the rebuild drive 130-6.

In the same manner as or similar to described referring to FIGS. 2 and 3, the fourth drive 130-4 may read each piece of data D1, D2, and D3 through each of the peer drives 130-1, 130-2, and 130-3 and the peer-to-peer communications, rebuild the rebuild data D5 using data D4 stored in the fourth drive 130-4 and each piece of the data D1, D2, and D3 read from each of the peer drives 130-1, 130-2, and 130-3, and write the rebuild data D5 in the rebuild drive 130-6.

FIG. 9 is a block diagram which describes a write operation of the RAID system according to at least some example embodiments of the inventive concepts. A RAID write operation will be described in detail referring to FIG. 9. A RAID system 100D includes the host system 110, the PCIe switch 120, and a plurality of drives 130-1, 130-2, and 130-3A. It is assumed that a plurality of drives 130-1, 130-2, and 130-3A have the same structure and operation. It is assumed that a third drive 130-3A is a drive for storing parity data PDATA of data DATA1 stored in the first drive 130-1 and data DATA2 stored in the second drive 130-2.

The host software 112 transmits a write command WCMDa and write data WDATAa to the first drive 130-1. The first drive 130-1 receives the write command WCMDa and the write data WDATAa, creates a command for reading the parity data PDATA stored in a memory region 145-3A of the third drive 130-3A used as a peer drive based on the write command WCMDa, and issues the command to the third drive 130-3A.

The first drive 130-1 reads the data DATA1 stored in the memory region 145-1 in response to the write command WCMDa, performs an XOR operation on the write data WDATAa, the data DATA1, and the parity data PDATA, creates new parity data according to a result of the operation, and write the new parity data in the memory region 145-3A of the third drive 130-3A. The first drive 130-1 transmits a completion interrupt to the host system 110. The first drive 130-1 and the third drive 130-3A may transmit or receive the parity data PDATA and the new parity data to or from each other through the peer-to-peer communications.

The RAID system 100D may perform the peer-to-peer communications between the drives 130-1 and 130-3A without an intervention of the host system 110, and since the first drive 130-1 is capable of creating the new parity data for itself, the RAID system may perform distributed parallel processing without degradation in performance of the host system 110.

FIG. 10 is a block diagram which describes a read operation of the RAID system according to at least some example embodiments of the inventive concepts. A RAID system 100E includes the host system 110, the PCIe switch 120, and the plurality of drives 130-1, 130-2, and 130-3A.

The host system 110 transmits a read command RCMDa to the first drive 130-1 through the PCIe switch 120. When data DATA1a includes an uncorrectable error, the first controller 135-1 does not inform the host system 110 of an occurrence of the uncorrectable error.

Once an uncorrectable error occurs, the first controller 135-1 creates a read command for reading data DATA2 stored in the second drive 130-2 and issues (or outputs) the read command to the second drive 130-2. At this time, the first drive 130-1 is used as a master device and the second drive 130-2 is used as a peer drive. The first controller 135-1 creates a read command for reading the parity data PDATA stored in the third drive 130-3A, and issues (or outputs) the read command to the third drive 130-3A. At this time, the first drive 130-1 is used as a master device and the third drive 130-3A is used as a peer drive.

The first controller 135-1 performs an XOR operation on the data DATA2 transmitted from the second drive 130-2 and the parity data PDATA transmitted from the third drive 130-3A, reconstructs the data DATA1 according to a result of the XOR operation, and write reconstructed data DATA1 in the memory region 145-1. The first controller 135-1 transmits the reconstructed data DATA1 for the read command RCMDa to the host system 110 through the PCIe switch 120.

Figure 11:
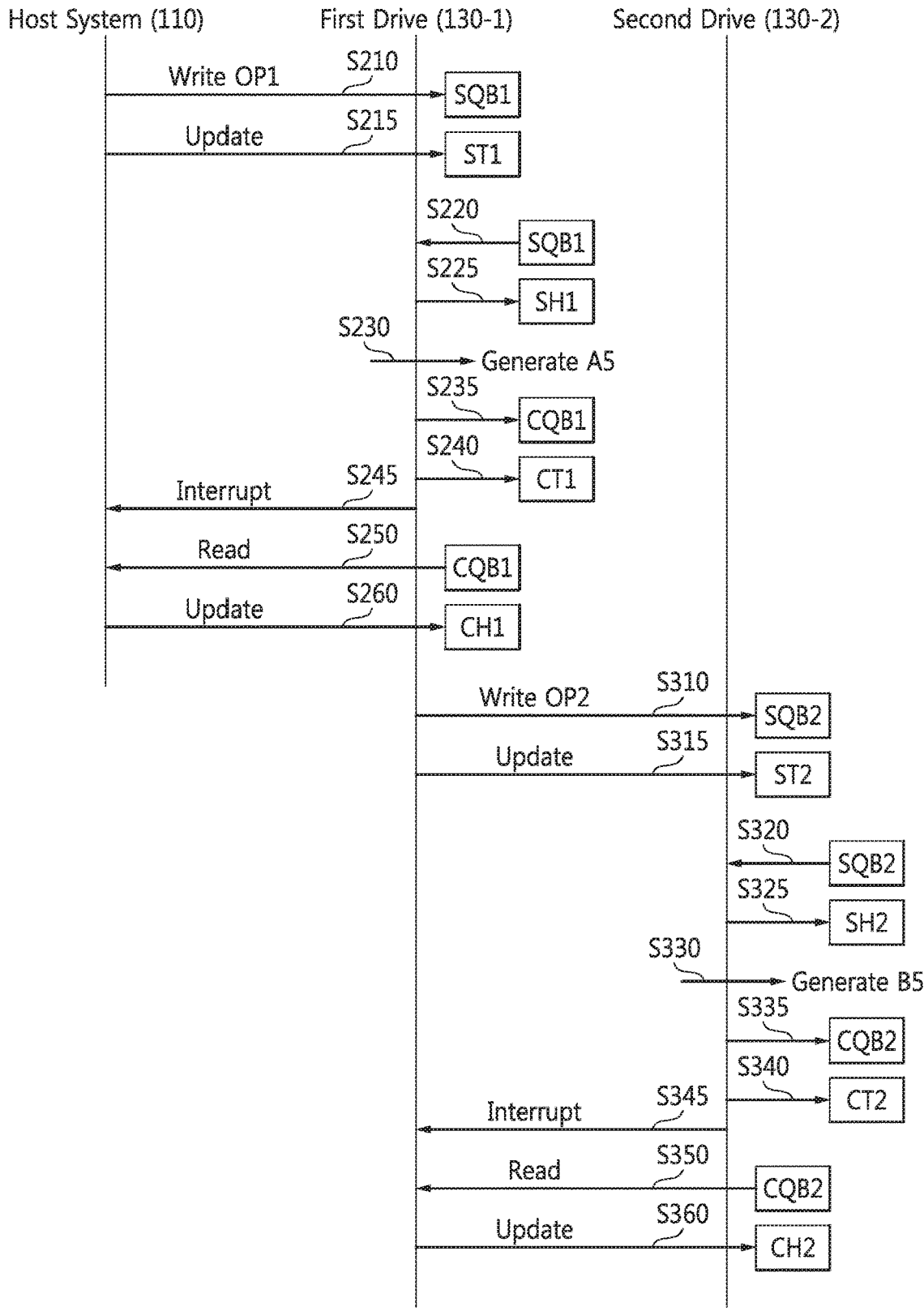
FIG. 11 is a conceptual diagram which describes a peer-to-peer operation of the first drive which can be used as a master device or a slave device.

FIG. 11 is a conceptual diagram which describes a peer-to-peer operation of the first drive which can be used as a master device or a slave device.

The first drive 130-1 creates a write command, a read command, or a RAID rebuild command for itself using data stored in the first submission queue SQB1, the first completion queue CQB1, and/or the first data buffer DB1, and issues the write command, the read command, or the RAID rebuild command to the second drive 130-2, the second drive 130-2 issues a completion interrupt for the write command, the read command, or the RAID rebuild command to the first drive 130-1, and a process in which the first drive 130-1 receiving the completion interrupt from the second drive 130-2 processes the completion interrupt for itself will be described in detail with reference to FIGS. 1 to 11.

The host system 110 used as a master device of the first drive 130-1 writes a first operation code OP1 in the entry of the first submission queue SQB1 (S210). It is assumed that the first operation code OP1 includes bits instructing a write operation, a read operation, or a RAID rebuild operation.

The host system 110 updates a value (for example, 0) of the first submission queue Tail Doorbell register ST1 to a new value (for example, 1) (S215). When the value of the first submission queue Tail Doorbell register ST1 is updated, the first control logic circuit 136-1 may determine that a new command to be processed is submitted.

The first control logic circuit 136-1 reads (or fetches) the first operation code OP1 stored in the first submission queue SQB1 (S220), and updates a value (for example, 0) of the first submission queue Head Doorbell register SH1 to a new value (for example, 1) (S225).

The first control logic circuit 136-1 executes a first operation OPE1 based on the first operation code OP1 (S230). When the first operation OPE1 succeeds, the first control logic circuit 136-1 writes an indication signal indicating a success of the first operation OPE1 in the first completion queue CQB1 (S235). The first control logic circuit 136-1 updates a value (for example, 0) of the first completion queue Tail Doorbell register CT1 to a new value (for example, 1) (S240).

The first control logic circuit 136-1 transmits a completion interrupt to the host system 110 (S245). The host system 110 reads the indication signal stored in the first completion queue CQB1 based on the completion interrupt (S250), and updates a value (for example, 0) of the first completion queue Head Doorbell register CH1 to a new value (for example, 1) (S260).

The first drive 130-1 used as a master device of the second drive 130-2 writes a second operation code OP2 in an entry of the second submission queue SQB2 (S310). It is assumed that the second operation code OP2 includes bits instructing a write operation, a read operation, or a RAID rebuild operation.

The first drive 130-1 updates a value (for example, 0) of the second submission queue Tail Doorbell register ST2 to a new value (for example, 1) (S315). When the value of the second submission queue Tail Doorbell register ST2 is updated, the second control logic circuit 136-2 may determine that a new command to be processed is submitted.

The second control logic circuit 136-1 reads (or fetches) the second operation code OP2 stored in the second submission queue SQB2 (S320), and updates a value (for example, 0) of the second submission queue Head Doorbell register SH2 to a new value (for example, 1) (S325).

The second control logic circuit 136-2 executes a second operation OPE2 based on the second operation code OP2 (S330). When the second operation OPE2 succeeds, the second control logic circuit 136-2 writes an indication signal indicating a success of the second operation OPE2 in the second completion queue CQB2 (S335). The second control logic circuit 136-2 updates a value (for example, 0) of the second completion queue Tail Doorbell register CT2 to a new value (for example, 1) (S340).

The second control logic circuit 136-2 transmits a completion interrupt to the first drive 130-1 (S345). The first control logic circuit 136-1 reads the indication signal stored in the second completion queue CQB2 based on the completion interrupt (S350), and updates a value (for example, 0) of the second completion queue Head Doorbell register CH2 to a new value (for example, 1) (S360).

According to at least some example embodiments of the inventive concepts, steps S310 to S360 may be executed between steps S230 and S235. According to at least some example embodiments of the inventive concepts, each of the operations OPE1 and OPE2 may be a write operation, a read operation, or a RAID rebuild operation.

According to at least some example embodiments of the inventive concepts, a master drive including a submission queue, a completion queue, and/or a data buffer can create a write command, a read command, or a RAID rebuild command using data stored in the submission queue, completion queue, and/or the data buffer for itself, and transmit the write command, the read command, or the RAID rebuild command to a peer drive.

The peer drive can transmit a completion interrupt for the write command, the read command, or the RAID rebuild command to the master drive, and the master drive can process the completion interrupt for itself.

According to at least some example embodiments of the inventive concepts, a RAID system including a host system and data storage drives can perform a peer-to-peer distributed parallel RAID rebuild operation between the data storage drives when the RAID system is rebuilt. Accordingly, it is possible to prevent degradation in computing performance of the host system and to reduce RAID rebuild time.

According to at least some example embodiments of the inventive concepts, in the RAID system including a host system and data storage drives, since traffic of read data moves between the data storage drives in a peer-to-peer manner through a PCIe switch, it is possible to perform a RAID rebuild larger than a bandwidth of the host system.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A data storage system comprising:
a peripheral component interconnect express (PCIe) switch;
a plurality of source storage devices connected to the PCIe switch; and
a rebuild storage device connected to the PCIe switch,
wherein the source storage devices are configured to communicate, through peer-to-peer communications with each other via the PCIe switch, data for performing a data rebuild operation for the rebuild storage device,
wherein the plurality of source storage devices includes a first source storage device and second source storage devices,
wherein the first source storage device is configured to,
receive data from at least one of the second source storage devices via the PCIe switch,
read first data from a memory of the first source storage device, and
perform the data rebuild operation based on the first data and the data received from the at least one of the second source storage devices.

2. The data storage system of claim 1, wherein the plurality of source storage devices and the rebuild storage device are NVM Express (NVMe) storage devices.

3. The data storage system of claim 1, further comprising:
a controller configured to transmit, to each of the plurality of source storage devices through the PCIe switch, different pieces of rebuild allocation information allocated to each of the plurality of source storage devices and the number of the plurality of source storage devices.

4. The data storage system of claim 3,
wherein the first source storage device is configured to transmit a read command to each of the second source storage devices through the PCIe switch for the data rebuild operation based on rebuild allocation information stored on the first source storage device and the number of the source storage devices.

5. The data storage system of claim 4,
wherein the at least one second source storage device is the second storage devices, and
wherein each of the second source storage devices is configured to,
read respective second data from a memory of each of the second source storage devices based on rebuild allocation information stored on each of the second source storage devices, the number of the plurality of source storage devices, and the read command, and transmit the respective second data to the first source storage device through the PCIe switch.

6. The data storage system of claim 5, wherein the first source storage device is configured to,
   read the first data from the memory of the first source storage device based on the rebuild allocation information stored on the first source storage device and the number of the plurality of source storage devices,
   perform the data rebuild operation based on the first data and the respective second data transmitted from each of the second source storage devices, the data rebuild operation including generating rebuild data, and
   transmit the rebuild data to the rebuild storage device through the PCIe switch.

7. The data storage system of claim 6, wherein the plurality of source storage devices are configured to perform, without an intervention of the controller,
   the reading of the respective second data,
   the reading of the first data, and
   generation of the rebuild data.

8. The data storage system of claim 6, wherein the plurality of source storage devices are configured such that the reading of the respective second data and the reading of the first data are performed in a parallel manner.

* * * * *